United States Patent [19]

Neumann

[11] Patent Number: 4,742,609
[45] Date of Patent: May 10, 1988

[54] AUTOMATIC METAL MACHINING CENTER SYSTEM

[75] Inventor: Paul J. Neumann, Cincinnati, Ohio

[73] Assignee: Manuflex Corporation, Cincinnati, Ohio

[21] Appl. No.: 923,248

[22] Filed: Oct. 27, 1986

[51] Int. Cl.⁴ .................. B23Q 3/155; B23Q 11/08; B23B 25/04
[52] U.S. Cl. .................. 29/568; 29/26 A; 52/66; 82/34 R; 74/608; 408/56; 408/234; 409/135; 409/235
[58] Field of Search .............. 52/66; 74/608, 609, 74/612, 616; 408/56, 60, 61, 67, 234; 29/568, 27 A, 26 A; 409/135, 136, 137, 134, 235; 82/34 R, 34 A

[56] References Cited

U.S. PATENT DOCUMENTS

| | | | |
|---|---|---|---|
| 4,185,376 | 1/1980 | Johnstone | 408/56 |
| 4,349,946 | 9/1982 | McMurtry | 29/568 |
| 4,484,387 | 11/1984 | Nachmany | 409/137 |
| 4,545,271 | 10/1985 | Romi | 82/34 R |
| 4,554,495 | 11/1985 | Davis | 318/572 |
| 4,576,069 | 3/1986 | Bazuin | 82/34 R |
| 4,617,503 | 10/1986 | Davis et al. | 318/572 |
| 4,673,076 | 6/1987 | Mattson | 198/346.2 |
| 4,677,718 | 7/1987 | Babel | 29/33 |

FOREIGN PATENT DOCUMENTS

| | | | |
|---|---|---|---|
| 3308444 | 9/1984 | Fed. Rep. of Germany | 29/568 |
| 238755 | 9/1986 | German Democratic Rep. | 29/568 |
| 106704 | 8/1980 | Japan | 82/34 R |
| 165950 | 10/1983 | Japan | 29/568 |

*Primary Examiner*—Gil Weidenfeld
*Assistant Examiner*—Daniel W. Howell
*Attorney, Agent, or Firm*—Biebel, French & Nauman

[57] ABSTRACT

A machining center, particularly adapted for automated turning of workpieces, includes a headstock with one or more rotatably mounted spindles located in spaced generally horizontal alignment with drive means connected to rotate the spindles independently of each other as necessary. Automatic chucks or collets are mounted on and driven by each spindle. A bed supporting a power-driven cross slide extends across the axis of the spindle and at one end substantially beyond, in an offset T configuration, defining one or more machining areas between the chucks and one end of the bed. A ram carrying one or more tools, and mounted on the slide parallel to the spindle axes, faces into the machining area. A ram drive moves it toward and away from the chuck to maneuver a tool with respect to workpieces. Barriers including interconnected top, side and end walls define machine rooms isolating the headstock, bed, slide, all of the drives and all but the one end of the ram from a machining area occupied by the chuck(s) and tool holder. The rooms encompass the range of movement of the one end of said ram as the slide is traversed along the bed. Doors in the rooms allow loading and unloading of workpieces.

28 Claims, 16 Drawing Sheets

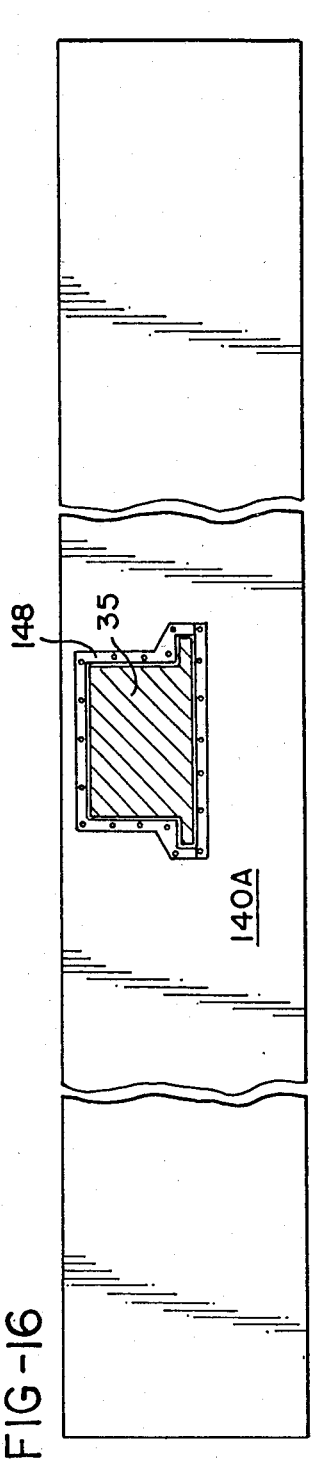
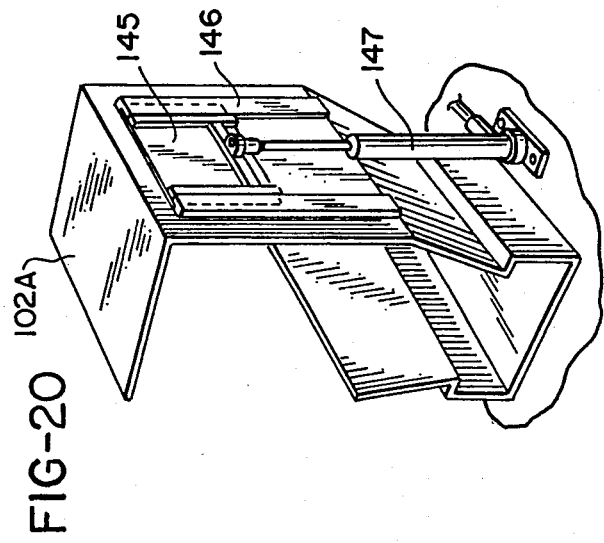
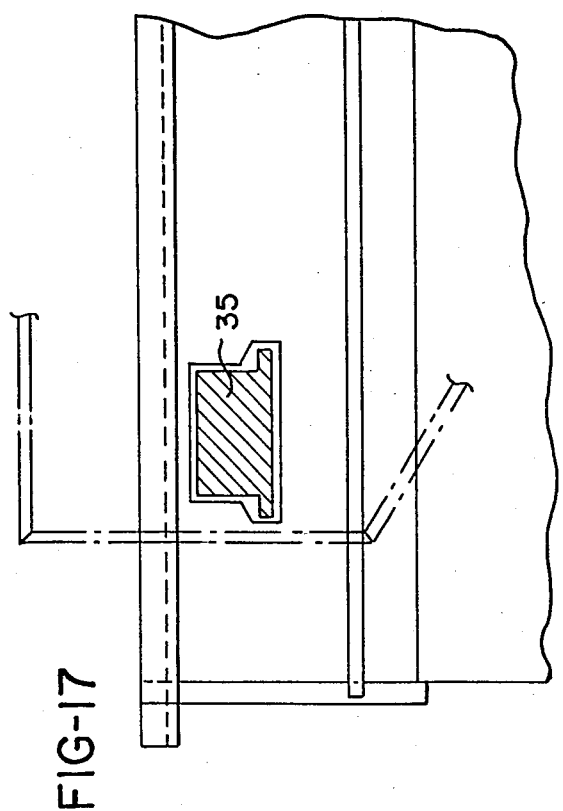

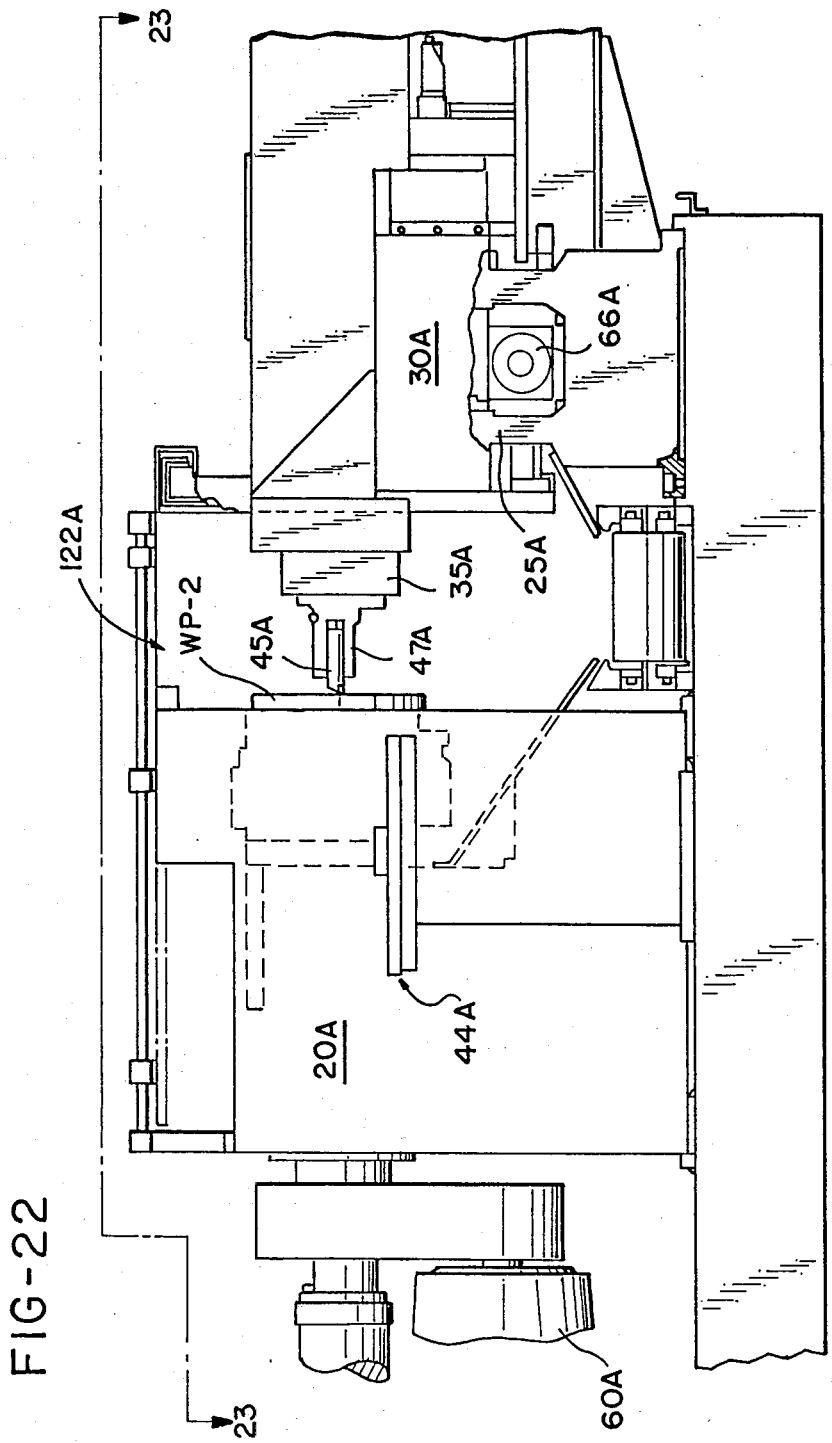

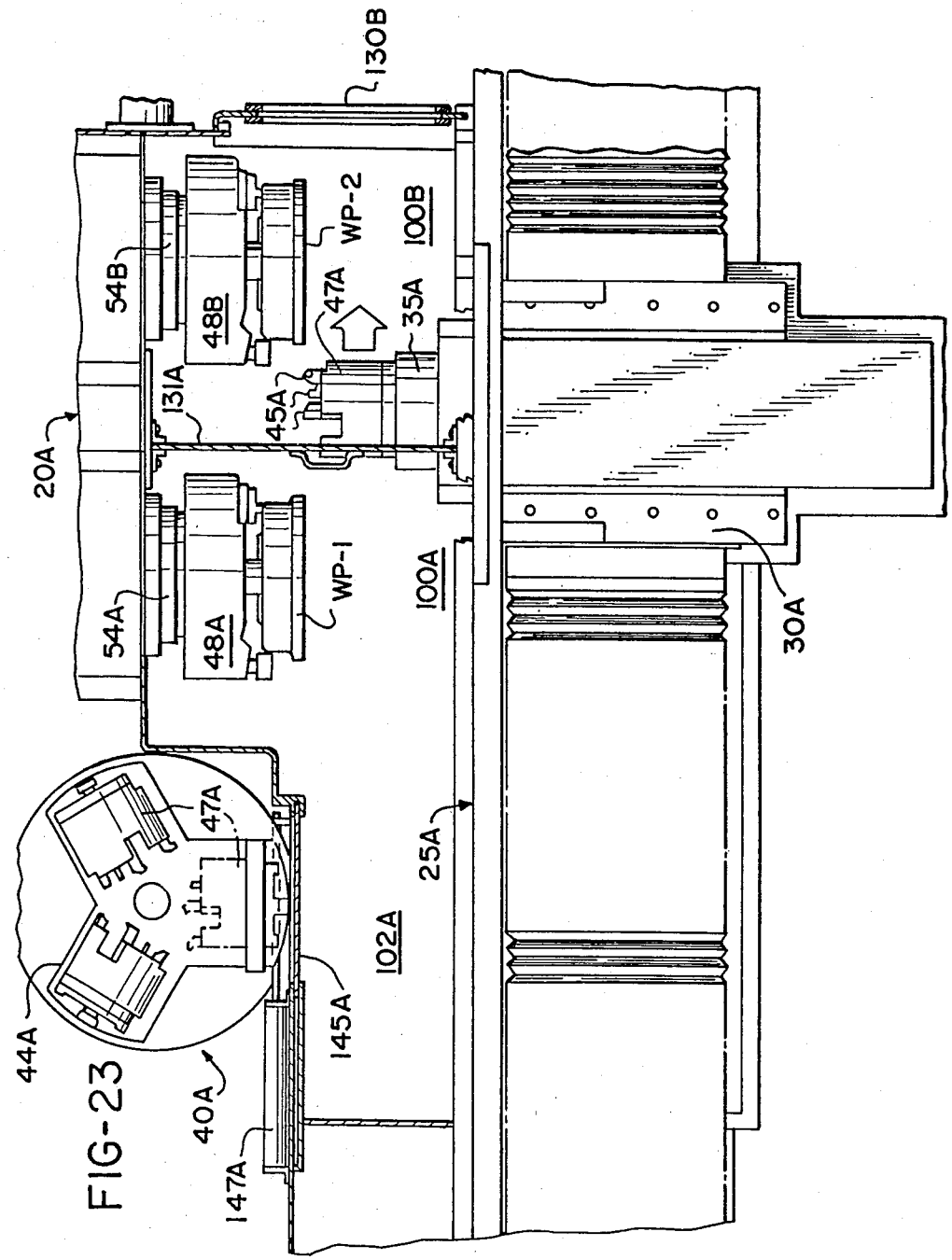

AUTOMATIC METAL MACHINING CENTER SYSTEM

BACKGROUND OF THE INVENTION

The present invention relates to a system for automation of a metal machining center, such as a turning center, and more particularly to such a center which eliminates most operator intervention during automatic machining operations.

Attempts have been made to automate machining and work quality verification operations on the same machine, sucn as a lathe. Any practical form of automation requires automatic tool changing capability, and some degree of automation has been achieved by utilizing rotating turrets or other forms of tool storage magazines, and when quality verification is desired this creates a need for the ability to verify the measuring process itself.

For example, in automatic turret lathes a plurality of tools are located on one or more rotatable turrets supported on the cross slide, and the turret can be rotated to bring into an active position any one of the tools fixed to the turret. Of course, the turret and all its moving parts are constantly exposed to chips from the workpiece being machined with the possibility that chips will lodge in the moving parts, resulting in the turret jamming or the tool becoming misaligned in some way that the required accuracy is not attained during machining operations. If any of these things occur during automatic operations, an operator is required to stop the cycle and intervene to correct the stoppage prior to resuming operations, or else the workpiece operated on will become scrap.

Another type tool changing device used, for example, in an automatic horizontal spindle chucker, provides a tool magazine at a fixed location on the main frame of the machine for storing a plurality of tools which can be exchanged with an active tool in an appropriate holder on the cross slide. This requires the cross slide to be moved to a position adjacent the magazine during the transfer of tools and/or probes between the magazine and the actve tool holder mounted on the cross slide. Since this tool exchange requires a substantial amount of time, particularly in traversing the slide and re-orienting the active tool holder toward the tool magazine, the full benefit of automatic operations is not achieved.

Additionally, any machine which incorporates tool changing normally uses some type of tool magazine or store and cutting tools which are all fitted to commonly dimensioned tool carriers. The tool holder on the slide, for supporting a selected cutting tool, is fitted with an appropriate socket into which any carrier can be engaged, and such socket is generally prone to having debris such as metal chips becoming lodged therein, as well as catching on other parts of the tool holder. This can interfere with maintaining the proper alignment of the working tool due, for example, to such debris becoming lodged in the socket of the tool holder and causing misalignment of the tool, introducing error into the machining operation which may not be readily detected.

Further, during extended automatic operations metal chips, other debris, and contaminated coolant can also collect on the bed and the ways, as well as the tool changer and other operating portions of the lathe. In addition to presenting an ongoing maintenance problem, this condition can affect the alignment and free movement of the cross slide, its carriage, the ways, and any ram or the like fitted to the slide, and cause damaging wear to all these parts.

When quality verification is introduced, as by utilizing checking probes or the like fitted to the tool holder instead of a tool, the same problems spill over into the measuring/verifying process, and can be just as critical in that respect. Further, when utilizing probing techniques for automatically determining the machining quality, especially with conventional horizontal spindle lathes or "chucker" designs, due to the machine configuration, excessive yaw, pitch and roll of the mechanical slides may tend to cause variances beyond allowable tolerances in the workpieces machined. Specifically, it has been found that conventional spacing between the bearing ways to the tool center line and from the tool slide way to the workpiece, along with a standard guide way width, do not provide the required vertical and horizontal stability.

When using checking probes, mounted in the tool holder, for work quality verification, it is highly desirable that the slides, their drives, etc. be as close to possible in the same postion of extension/retraction when the probes are verified as when they are actually probing a workpiece. To accomplish this on a conventionally constructed lathe or "chucker" is not feasible to the elongated bed layout of such machines. Verification usually must occur at the opposite end of the bed ways from the chuck or other workpiece holder, e.g. from the machining area.

Accordingly, there is a need for an automatic machining center system for lathes and other turning tools which, during extended automatic machining operations, will achieve the required close tolerance and machining accuracy in less time while requiring little if any operator intervention.

SUMMARY OF THE INVENTION

The present invention is directed to an improved automatic machining center, such as a lathe or similar turning tool having a tool changing capability, which is capable of extended automatic operations. The bed of the apparatus is located transverse to the headstock center line in a T-configuration which minimizes floor space, and a slide, supporting a cross-slide is driven to move along the bedways transversely to the headstock spindle and toward/away from a chick or other workpiece supporting device mounted to the spindle. A ram with a tool holder at one face is supported by the cross-slide to maneuver that holder in the machining area around the workpiece. A machine room is built around the machining area, which room isolates the metal chips produced during machining operations, and coolant spray, from the moving parts of the lathe except for the chuck, the workpiece, the single cutting tool in use, the tool holder at the ram face, and the chip collector system, and protects the moving parts of the machine tool from thermal distortion.

The tool changing apparatus includes one or more magazines or storage drums holding a quantity of different tools all in common carriers, and preferably also holding one or more measuring probes in the same type of carrier, any of which can be mounted in the tool holder. This tool changing apparatus is located to one side of and adjacent the headstock, mounted on the same base structure and just outside an automatically operated door in the machine room wall, whereby access for exchange of tools with the tool holder on the ram is available.

Other unique features of the machining center include redesigned ways and a lengthened base of the guides, to significantly reduce the yaw, pitch and roll of the mechanical slides; utilizing a simple fixed tool holder with the active tool held in the inverted position and/or a live spindle for milling, drilling and boring operations in addition to turning operations; incorporating coolant and/or air nozzles into the face of the ram about the tool holder and having the plumbing incorporated into the ram structure; utilizing probe datum blocks and tool offset sensors to automatically test and verify the correct positioning of the tools and the accuracy of the cuts.

The automatic metal machining center according to the present invention is preferably illustrated as a lathe consisting of a headstock with a horizontal rotatably mounted spindle having a workpiece mounting means (e.g. a chuck) fixed to one end of the spindle and driven by a conventional drive means which prerferably is reversible, and having an automatic tool changer and probes for verifying machining accuracy, located to one side of the headstock. A bed is provided in a T-type relation to the headstock, a cross slide of improved design is mounted on the bed with a conventional drive for moving the slide on the bed. A ram is mounted on the cross slide, having a tool holder which faces the headstock and the tool changer, with a means for driving the ram toward and away from the tool changer and the workpiece mounting means.

Barrier means, including movable covers, define a machine room (including a chip conveyor), which comprises a generally rectangular enclosed main room or compartment, where the actual machining operation takes place. Isolated within the machine room or operations area, are the workpiece, the chuck, the tool and tool holder and a portion of the face of the ram. A generally rectangular machine room extension provides an area adjacent the tool changer, wherein the tool and probes are mounted in, or dismounted from, the tool holder and are verified in a protected region just outside the extension prior to operating on the workpiece.

In order to control the collection of chips and contaminated cooling fluid during automatic machining operations, a single stationary tool holder is provided on the face of the ram. The active tool is held in the stationary tool holder in the inverted position, and this inversion of the tool provides for direction of chips downward to the floor of the machine room and onto the chip conveyor.

In other embodiments, a driven rotating tool holder (or live spindle) may replace the simple fixed tool holder, or both a fixed tool holder and a driven rotating tool holder can be located side-by-side on the ram face.

In order to supply coolant and air to the active cutting tool, a plurality of coolant and air nozzles are provided about the tool holder or holders on the ram face. The coolant nozzles supply coolant during the cutting process and the air nozzles are utilized to clear the workpiece chuck tool and tool holder of metal chips. The nozzles are connected to supply plumbing in the ram structure.

The machine room is designed to cooperate with such a T-configured machine tool. Specifically, in response to advancing automation technology which requires changing the shape of a workpiece by turning and boring at the same station and then utilizing automatic probing techniques to verify the quality of the machined workpiece, the yaw, pitch and roll of the mechanical slides must be reduced to a minimum while retaining the capability to maneuver the slides to numerous positions in the machining area. The T-shape configuration with the bed spaced from and transverse to the headstock and the lengthening of the slide guides not only reduces the yaw, pitch and roll of the slides but also facilitates the effective enclosure and isolation of the vast majority of the moving parts outside of the machining area. This configuration also allows the slide to carry probes across the centerline of the headstock spindle with the probe fully and accurately supported.

The machine room itself consists of a combination of barrier means or wall members specifically designed to provide for automatic machining operations while providing the added advantage of effectively controlling the metal chips and liquid coolant such that the chips are prevented from becoming lodged in the working parts of the lathe and/or other machining tools, thus reducing or eliminating unnecessary operator intervention. The machine room is an enclosed basically rectangular area having a top wall, two end walls, two side walls at least one of which slopes to a bottom where the chip conveyor is located.

Operating integrally with the main machine room is the aforementioned machine room extension which provides for the isolation of the ram, cross slide and bed from contaminants during the tool changing operation. This extension consists of a top barrier wall, two side barrier walls, an end barrier wall and a bottom barrier wall cooperating with the chip conveyor.

In place of the connected externally mounted cooling liquid and air nozzle system, the present invention incorporates an adjustable combined coolant/air nozzle bank within the ram face itself to lubricate the cutting tool during the cutting operations and to clear the tool workpiece and tool holder at the end of the operation. The individual nozzle consists of adjustable eye ball nozzles with cone heads, screw adjustable so various spray patterns can be utilized as necessary. The nozzles may be utilized as either air or coolant nozzles or both. If used for both coolant and air nozzles, a switching device is provided to allow the operator to select the particular function he wants the nozzles to perform at a particular time. The nozzle bank is connected to the air and coolant supply sources by conventional plumbing in the ram structure.

Additional components embodied in the system of the present invention include a separate storage compartment for probes used in verifying the accuracy of the machining operations, a probe datum block for checking the probe trip points and located near the machine room proximate the junction of the main machine room and the extension, and a tool offset sensor located in the vicinity of the junction of the main and extension portions of the machine room and which consists of a device similar to a camera with which that tool mounted in the tool holder can have its offset determined or its wear level determined in approximately 3–5 seconds, as opposed to the 30 seconds required by conventional methods.

The principal object of the present invention, therefore, is to provide a system for totally automating, with a minimum of human intervention, a machine tool with a closed machine room to isolate the moving parts of the machine tool from contamination by metal chips and contaminated liquid coolant; to provide such a system including verification of the machining accuracy; to provide for a significant reduction of the yaw, pitch and roll of the machine slides as they are maneuvered to various positions in the machining area; to improve the utilization of probing techniques in an automatic machine tool while improving achieveable tolerances on workpieces; to provide a simple tool holder and preferred inverted tool mounting which facilitates the direction of metal chips and contaminants away from the moving parts in the machine room; to provide an optional driven rotatable tool holder; to provide in a T-configured lathe or similar turning tool a storage magazine holding a plurality of cutting tools as well as measuring probes, all protected from the contaminants associated with the machining operation; to provide in such a machine tool a machine room encompassing a work station at which workpieces can be secured, have various machining operations completed thereon by one or a plurality of tools, and have the results verified utilizing probing techniques, preferably all under guidance of a numerical control system; and to provide such a system in which maintenance of the machine tool is greatly simplified.

Other objects and advantages of the invention will be apparent from the following description, the accompanying drawings and the appended claims.

BRIEF DESCRIPTION OF THE DRAWINGS

FIG. 16 is an isolated view of the moving wall attached to the ram face which allows the ram to maneuver from the tool exchange position to the machine room;

FIG. 17 is a partial view showing the movement of the ram located in the machine room;

FIG. 20 (sheet 13) is a partial perspective view of the machine room extension itself;

FIG. 22 is a side view, with the tool exchanger and tool/probe magazine removed, of another embodiment of the invention; and FIG. 23 is a partial plan view of the embodiment shown in FIG. 22.

DETAILED DESCRIPTION OF THE PREFERRED EMBODIMENT

Figure 1:
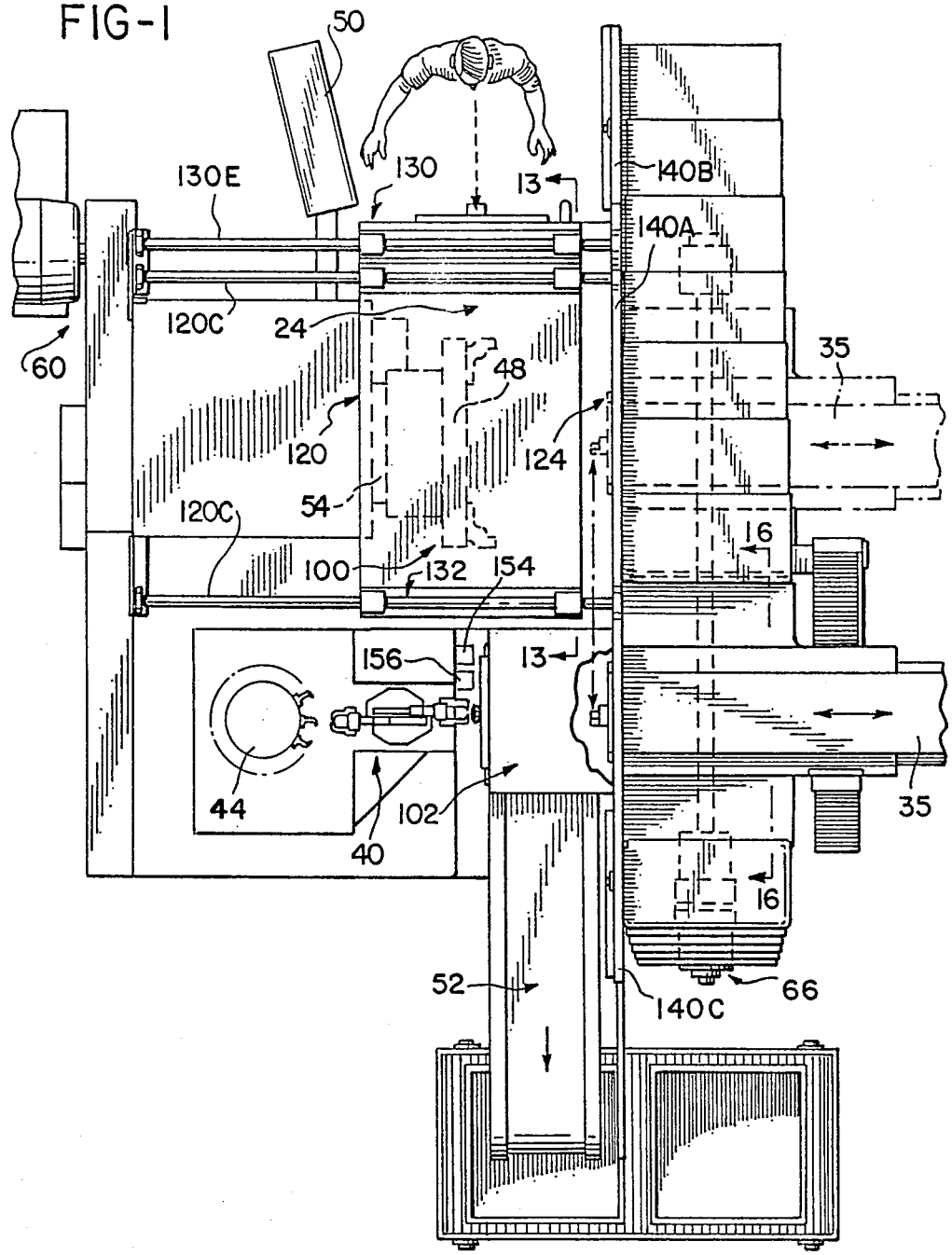
FIG. 1 is a top or plan view of the automatic machining system of the present invention.

Referring now to the drawings and specifically to FIGS. 1-2 and 6-8, the automatic metal machining center of the present invention is illustrated as a lathe constructed in a T-configuration (FIGS. 1, 2, and 5) and having an enclosed machine room (FIGS. 1-4). A lathe is shown for illustrative purposes, however the advantages of the T-configuration and the machine room both alone and/or in combination with other advantageous components hereafter described could be used with other machine tools.

The principal components of the system are a headstock 20, surrounded by an enclosed machining room 24, a bed 25 extending transversely to the headstock spindle axis along the side of the machine room opposite the headstock and having a set of rectangular ways 28 thereon. These bed ways support a slide 30 which is power driven along the ways, and carries a cross-slide 34 supported on ways 36 and power driven in a direction generaly parallel to the headstock spindle axis. The cross-slide supports a ram 35 which may be either fixed to the cross-slide, or be mounted on additional ways (not shown) with an additional drive if it is is desired to shorten the travel of the cross-slide and still obtain the desired maneuverability of the ram. For purposes of further description it is assumed that the ram is fixed to and moved by and with the cross-slide.

A tool exchanger 40 (FIGS. 1 and 5), incorporating a rotatable tool storage drum or magazine 44, holds a plurality of different cutting tools 45 and may also hold one or more measuring probes 46, all in interchangable carriers or holders 47 having tapered shanks of commonly known configuration.

Operation of the lathe and movements of the slide 30 and cross-slide 34 are automatically controlled through known numerical controls which can be used for programming a series of movements of the lathe components in order to make the desired operations on the workpiece and to check the operation for accuracy using probes 46. These controls are housed in a control station box 50 at the operator's station (FIG. 1) and control the operation and interaction of the headstock drive, the ram 35, the slide 30 and the tool/probe exchanger 40. Such numerical control systems are well known in the art and therefore are not discussed in detail herein.

All machining operations performed by the machining center or system are accomplished inside the machine room 24 which generally consists of a plurality of barrier means defining an enclosed area. The headstock includes a workpiece holding device, such as a multi-jaw chuck 48 located within the machine room, while the mechanisms for manipulating a particular cutting tool to perform various operations on a workpiece are external of the machining room. These mechanisms include bed 25, the main slide 30 and cross-slide 32 (except for the face of ram 35 mounted thereon), the tool/probe exchanger 40, and the drives for all of them. There is also a means for collecting and removing metal chips including a conveyor 52 which, through a portion of its path, extends beneath and cooperates with the floor of the machining room.

Figure 4:
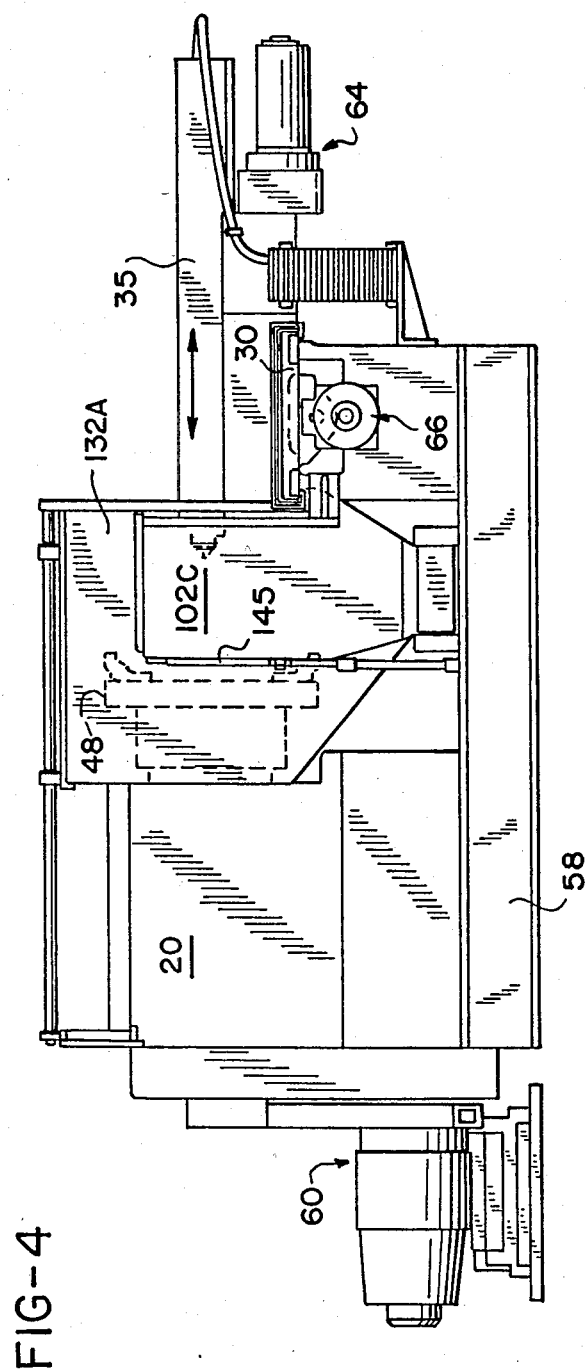
FIG. 4 is a partial view from the tool changer side of the system, but with the tool changer mechanisms omitted.
Figure 5:
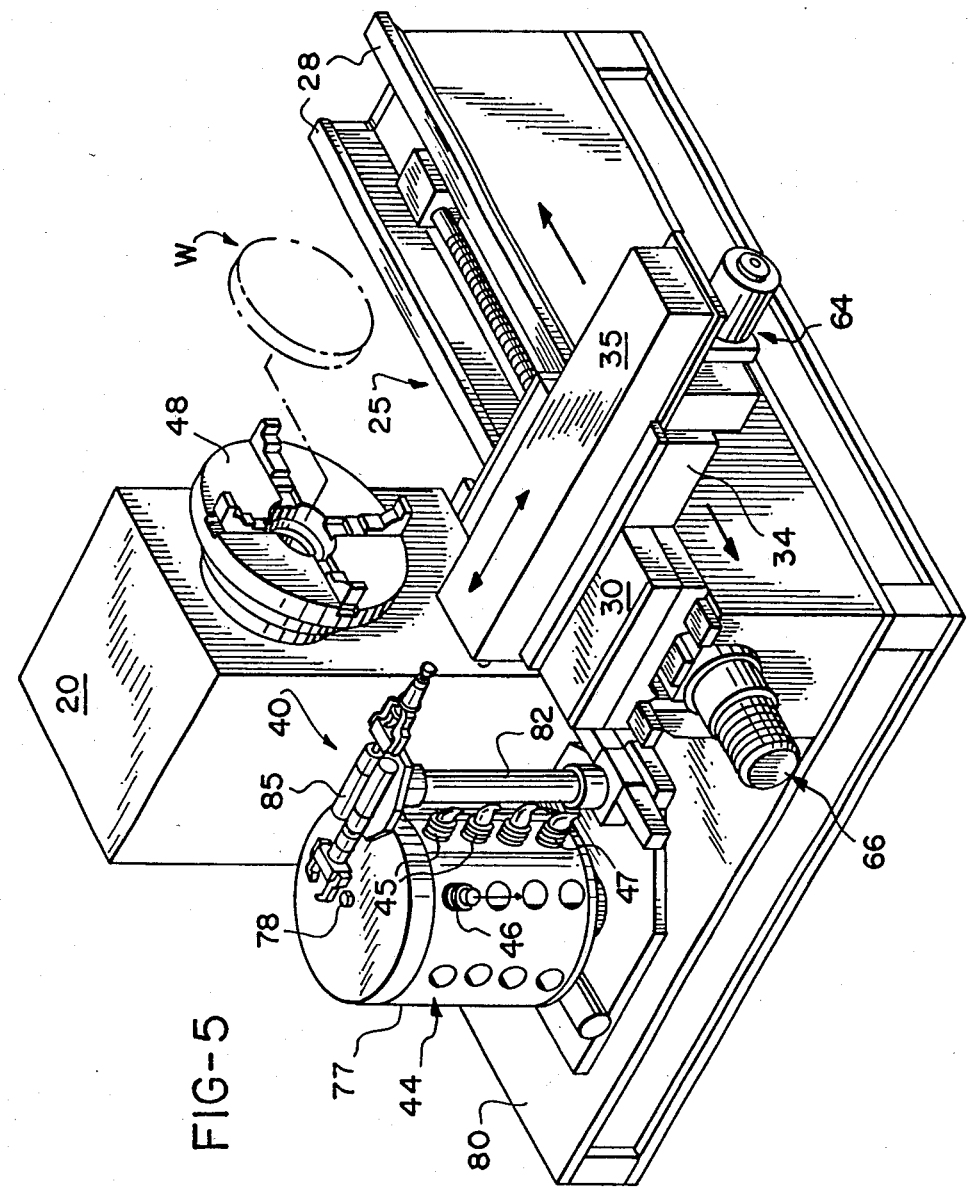
FIG. 5 is a perspective view of the machining center with the machine room and other covers removed.

As best illustrated in FIGS. 1, 4 and 5, the headstock 20 includes a main driven spindle 54 mounted therein, and carrying chuck 48 located at the end of the spindle. The headstock 20 is mounted on a base 58 and is powered by a conventional drive 60, which preferrably is a reversible drive to allow for machining operations across the centerline (or axis of rotation) of the headstock without requiring additional tools for that purpose.

Figure 6:
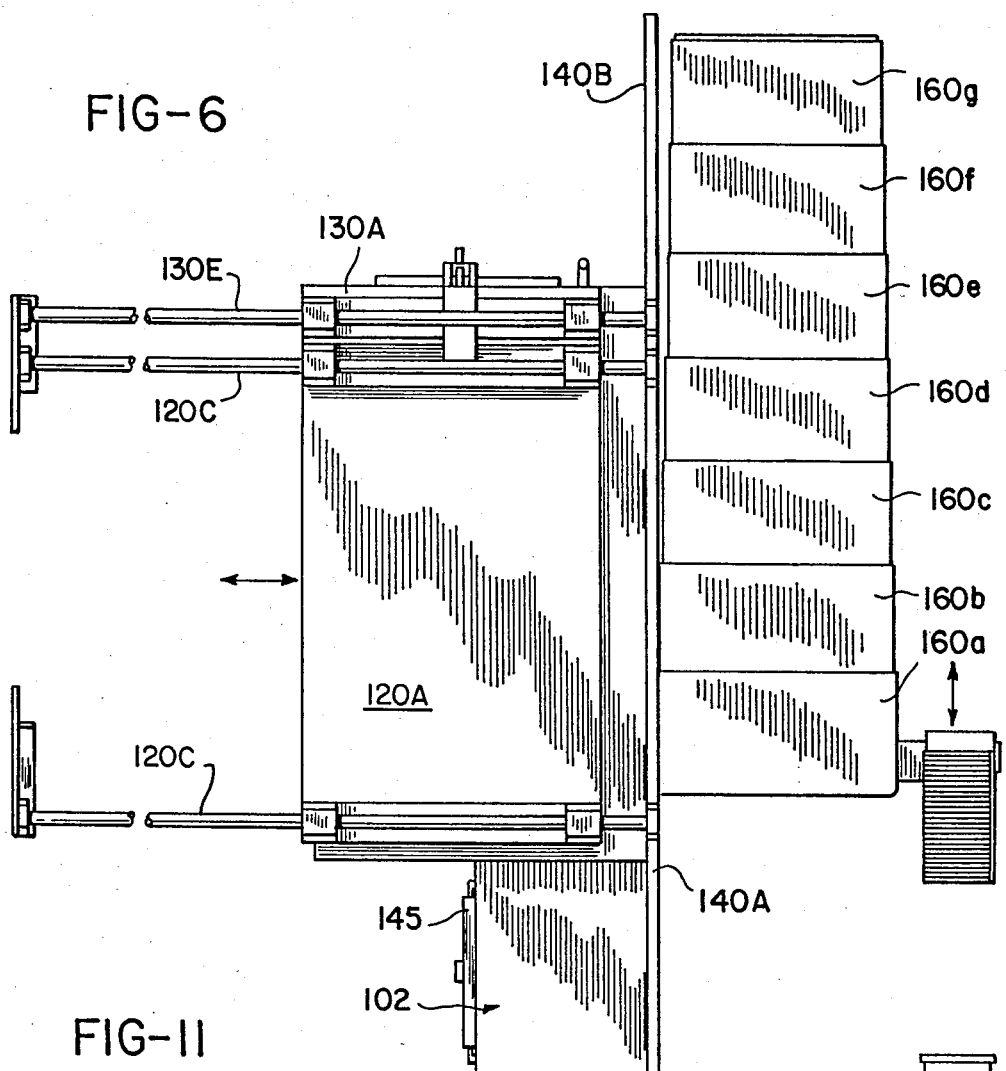
FIG. 6 is a top view of the machine room components isolated from the machine tool.

In the embodiment shown in FIGS. 1, 5 and 6, ram 35 contains one or more tool holders 62 facing headstock 20. The power drives 64, 66 for cross-slide 32 and main slide 30 respectively, are of conventional design, and not shown in detail.

The bed 25 is spaced an appropriate distance from the headstock depending upon the size of workpieces that the particular metal machining center is designed to accommodate, and chip conveyor 52 extends along the bottom of that space. The bed 25 extends a greater distance beyond the center line of the headstock spindle axis in the direction of the tool exchanger 40, so the ram 35 can be traversed to the tool/probe exchange station 40 in order to change tools 45 and/or probes 46, and also extends sufficiently in the opposite direction beyond the headstock spindle axis to allow machining on the far side of a workpiece. As noted, the ram 35 has at least one tool retainer 62, preferably consisting of a tapered socket 64 (see FIG. 10).

Figure 10:
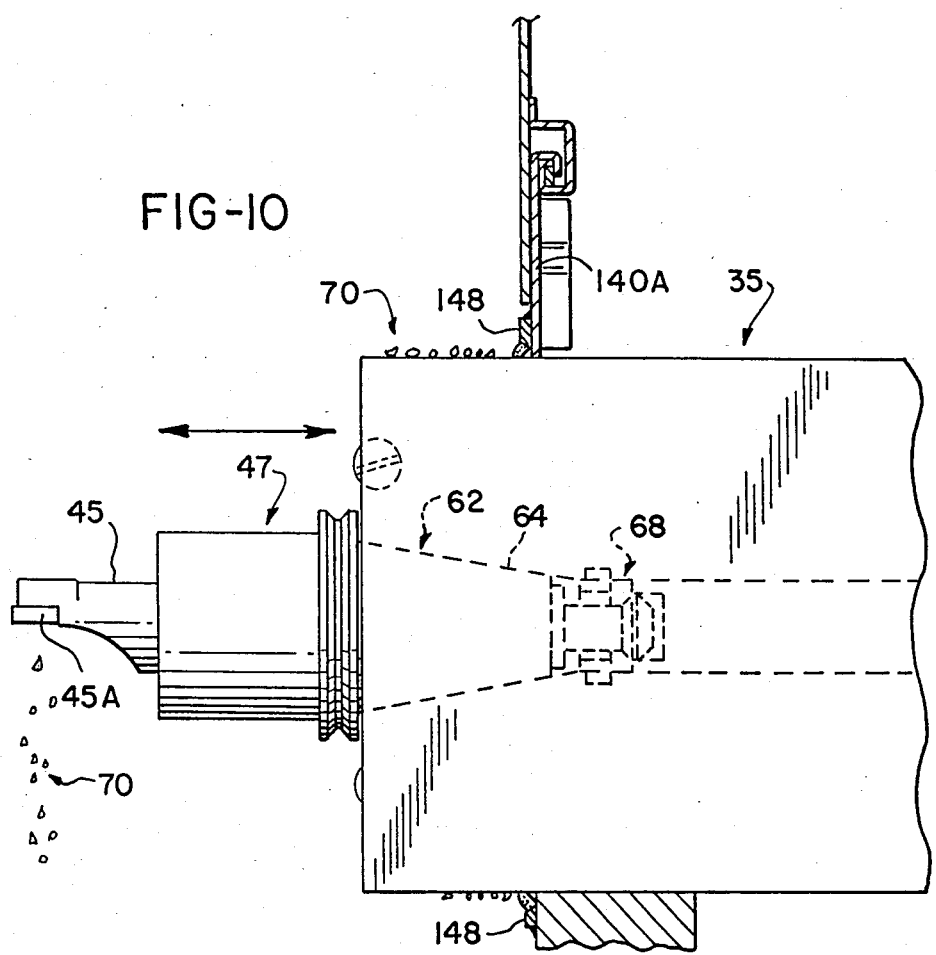
FIG. 10 is a partial view of the ram showing a single socket tool holder having a tool mounted therein.

As illustrated in FIG. 10, the preferred tool retainer 62 is simple to purge in that the tapered socket 64 faces into the machine room. A hydraulic cylinder actuated collet 68 at the inner end of the socket acts to draw the tool or probe holder 47 into the socket and lock it in position. The cutting tools 45 are positioned relative the workpiece in an inverted from normal position (note tip 45A), to facilitate directing metal chips 70 downwardly onto chip conveyor 52.

Figure 11:
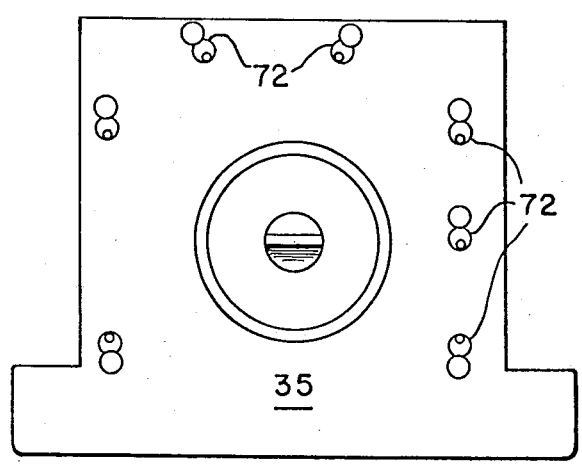
FIG. 11 (sheet 6) is a plan view of the ram face showing the coolant and air nozzles and a different tool mounted in the tool socket.

As illustrated in FIG. 11, a bank of coolant and/or air nozzles 72 are provided around the periphery of the tool retainer socket 64. Coolant nozzles provide a liquid coolant and lubricant, e.g. "cutting liquid", to the tool tip 45A and the workpiece W during a machining operation. Air nozzles are utilized to dislodge and purge metal chips 70 from the tool holder, the cutting tool and workpiece, so the chips fall to chip conveyor 52 in the bottom of machine room 24. On the face of ram 35, as illustrated in FIG. 11, the nozzles 72 each have a conventional adjustable "eye ball" nozzle which can be adjusted to a particular spray pattern. A portion of the nozzle bank can be dedicated to spray either air or liquid coolant, or all nozzles can be utilized selectively to spray both air and coolant. If the entire nozzle bank is used as both air and coolant nozzles, a conventional switching device (not shown) is provided to selectively switch from air to coolant and coolant to air. Conventional plumbing (not shown) is incorporated into the ram body and is connected to air and coolant supply sources, as appropriate.

In an alternative embodiment (FIG. 12) the ram 35 may be modified to include a live spindle 75 to allow for the use of rotating cutters such as mills, etc. in addition to turning operations on the rotating workpiece. This live spindle may be an added component or it may be the only tool holder contained in the ram 35.

As illustrated in FIGS. 1, 2, 6 and 12, the tool/probe exchanging station 40 includes the drum or magazine 44 for holding a plurality of the metal cutting tools 45 and/or probes 46 in common holders which fit into any of the tapered storage sockets in drum 44. When utilized to store both cutting tools and probes, the magazine 44 is preferably located to one side of and adjacent the headstock 20 and opposite the longer leg of the bed 25. The tool/probe exchanger 40 is located between the bed 25 and magazine 44. The drum-type magazine 44 includes a generally cylindrical frame 77 carried on a rotatable indexing shaft 78 which is supported on the tool exchanger base 80 which also supports a mast 82 carrying changer arm 85.

Figure 12:
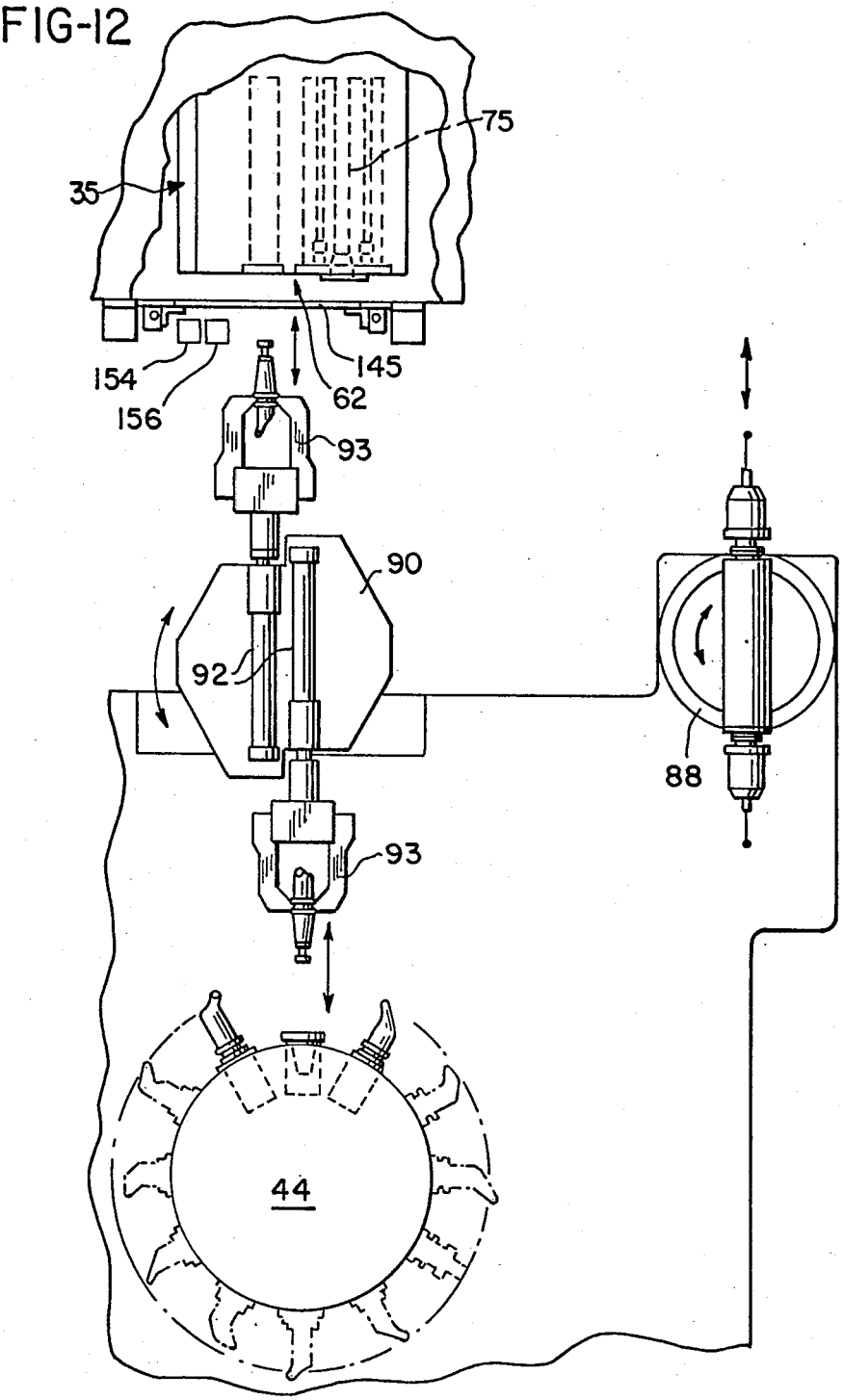
FIG. 12 is a partial top view of the tool changing station, including dedicated probes, a vertical drum tool magazine, and a ram having both a single socket tool and a live spindle.

FIG. 12 shows a modification, in which a separate probe storage magazine 88 is illustrated. Since it may be desirable to have the same test probes 46 associated with a single machine tool, such a separate probe storage magazine may be preferred for automatic operations, otherwise it is necessary, due to the numerical control system program, to requalify the probes on each particular machine with which they are used. By keeping the same probes with a particular machine in a separate magazine, it is possible to exchange the tool magazines 44 automatically by means of a robotic cart while avoiding constantly requalifying the probes 46.

In either embodiment, the tool/probe changer arm 85 incorporates a conventional rotatable head mechanism 90 on mast 82, and including a pair of telescoping arms 92, each fitted with a tool exchange grip 93 which can engage and transport any of the holders 47. The tool/probe changing station 40, in either case, operates in a conventional method and details thereof are not per se a part of the present invention.

An important aspect of the present invention is the removal and control of metal chips 70, and other contaminants, and to protect the components of the machine tool from the adverse effect of these contaminants and from thermal distortion, the machine room 24 is provided for isolating all components except for spindle 54 and chuck 48, tools being utilized to operate on the workpiece, and their holders at the face of ram 35, and the chip collector conveyor 52.

As illustrated in FIGS. 1–4 and 6–9, the machine room 24 is formed by a series of barrier means or walls designed to surround spindle 54, chuck 48, the tool and holder(s) 47 and the ram face, so they are the only machine components exposed to the metal chips 70 and liquid coolant or other contaminants. These barrier means protect and isolate the bed ways, the slides and other components from thermal distortion which might result from direct exposure to continuous machining operations inside the machine room.

In the embodiment illustrated, the machine room 24 consists of a large enclosed main area 100 (see FIGS. 1, 2 and 6) and a smaller enclosed extension area 102 connected to one end of the main area 100. However, it should be understood that the exact configuration of the machine room 24 will depend upon and must accommodate the particular configuration of a particular automatic machining center.

The main machine room 100 is defined within an upper barrier wall 120, a bottom wall consisting of a portion of conveyor 52, two side barrier walls 122, 124 with sloping bottom portions 122A and 124A which extend to opposite sides of the conveyor, and two end barrier walls 130 and 132, the latter having a sloping bottom portion 132A. The machine room extension 102 is similarly defined only smaller and merges with end wall 132 of the main room. The general configuration of the main room is shown in phantom lines in FIG. 9.

Figure 2:
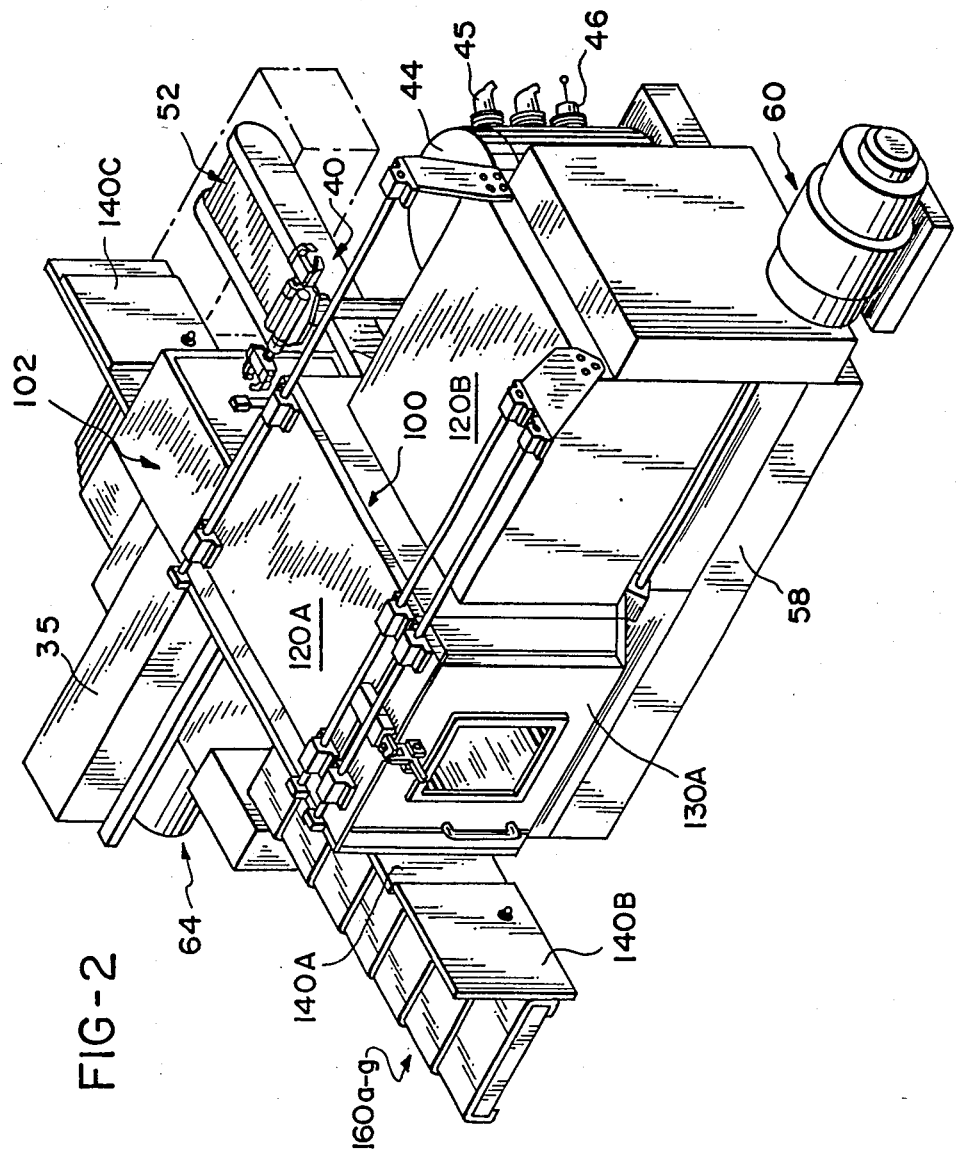
FIG. 2 is a perspective view of the system, as seen from the operator's station.
Figure 3:
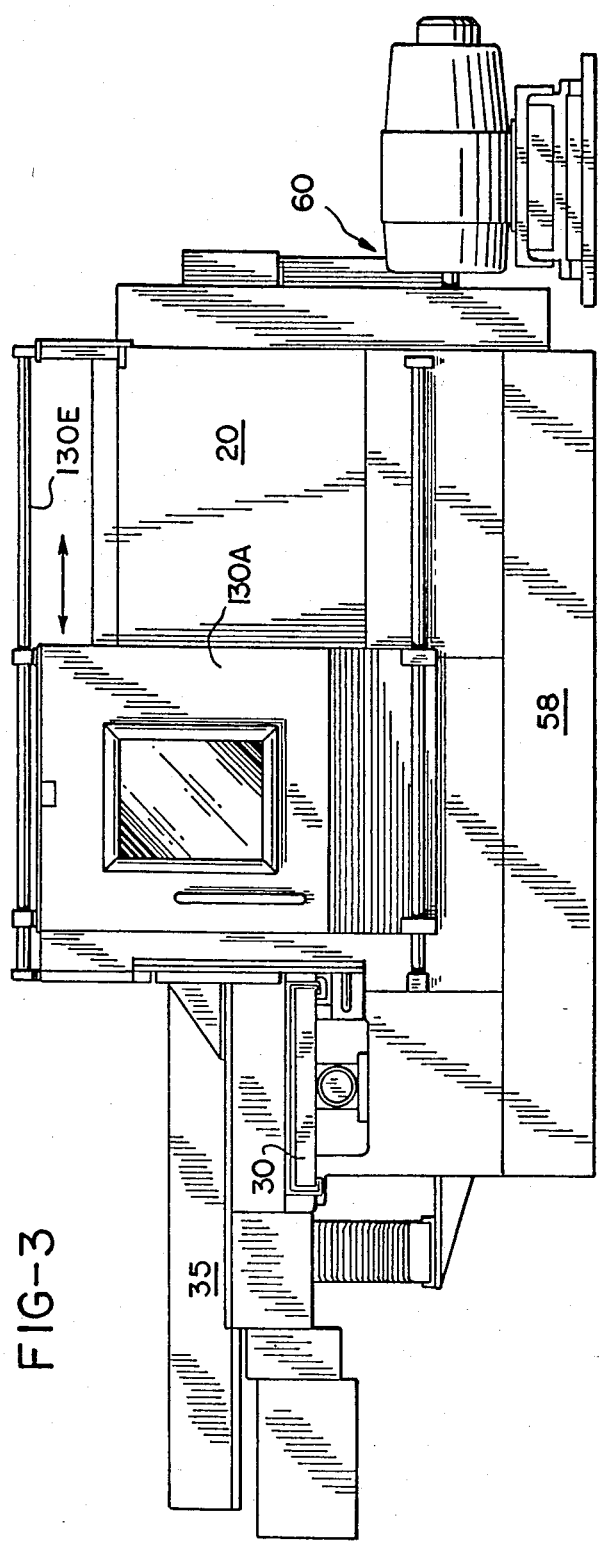
FIG. 3 is an end view from the operator station of the machining system.

As best illustrated in FIGS. 2, 3 and 6, the upper barrier wall 120 includes a fixed rectangular portion 120B and a large, movable generally rectangular upper door portion 120A which is slidably mounted on rods 120C. The door is positioned directly above spindle 54 and is movable from a closed position to an open position over headstock 20 by sliding it along rods 120C which are secured at one end to side wall 124 and at the other end to brackets connected to the headstock 20. This upper movable door 120A is provided so workpieces may be loaded and unloaded into chuck 48 by an overhead crane or the like (not shown).

Figure 8:
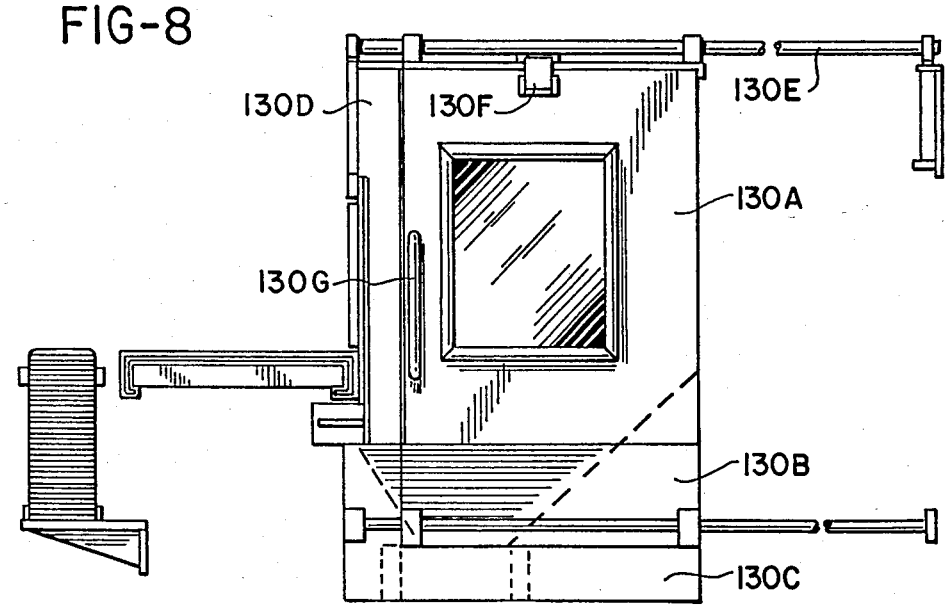
FIG. 8 is an end view from the operator station of the machine room components isolated from the machine tool.
Figure 13:
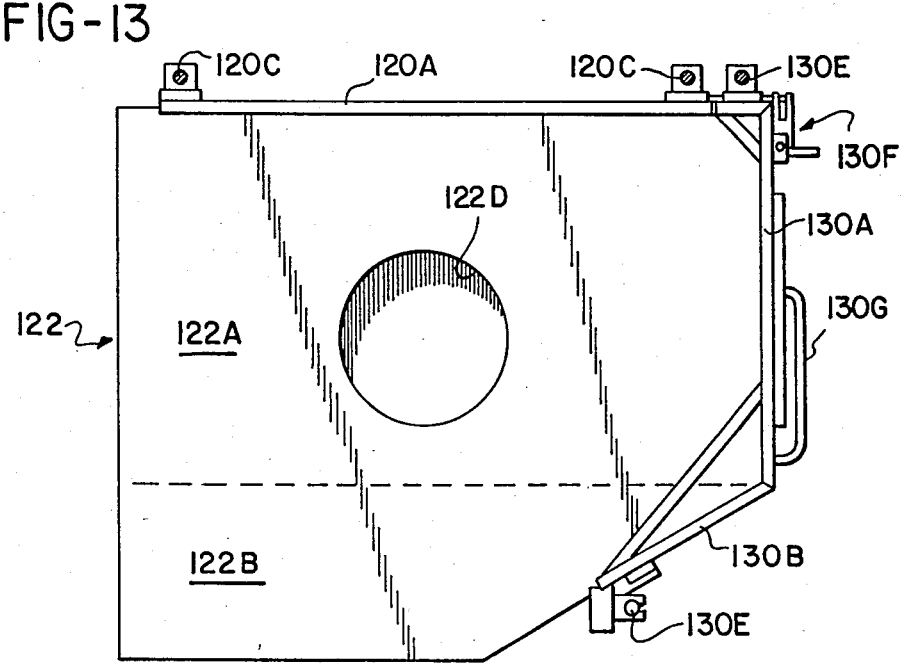
FIG. 13 (sheet 8) is a view of the headstock side barrier wall taken along lines 13—13 of FIG. 1.

As shown in FIGS. 8 and 13, the end barrier wall 130 which is nearest the operator, and most remote from the tool/probe exchanger 44, incorporates a generally rectangular access door 130A with an inward slanting lower panel 130B, a fixed lower partition 130C which merges with the conveyor 52, and a fixed side portion 130D which merge with side barrier wall 124. The door 130A and the fixed partition 130D also merge with top door 120A. Door 130A is slidable on rods 130E between open and closed positions, and the door is normally locked in place by a lock mechanism 130F. The movable end door fits with the fixed side partition 130D in its closed position, and is located alongside headstock 20 in its open position. By releasing lock mechanism 130F and grasping handle 130G an operator can slide the door open and enter the machine room 24 to accomplish various functions, make adjustments, perform maintenance, etc. A window allows direct operator observation through door 130A of a workpiece, from the operator station. The lower fixed position 130C and the lower panel of door 130A merge to form a sloping wall which slopes away from the operator station toward chip conveyor 52.

As illustrated in FIGS. 1, 2 and 13, the side barrier wall 122 is constructed generally flush with the headstock 46, and consists of an upper basically rectangular portion 122A and a lower 122B portion, which merge respectively with upper barrier wall 120 and end wall 130 at approximately right angles. Upper portion 122A has a generally circular cut-out 122C which fits around spindle 54 flush with the headstock housing. Lower wall portion 122B slopes downwardly and away from the headstock toward the carriage bed to merge with the chip conveyor 52. Conventional seals are provided at the connections of wall 122 with upper wall 120, end wall 130, and around the spindle opening in order to assure that no contamination, either chips or coolant, is allowed to enter into the headstock mechanism.

As shown in FIGS. 2 and 16–18, side wall 124 consists of three portions. A fixed upper portion 124A merges with the fixed portion 122B of the upper wall 120 and with fixed side wall portion 130D at approximately right angles, respectively. The upper fixed portion 124A extends from its connection with upper wall 120 down near the top portion of the ram 35. To isolate the maximum number of moving parts of the ram from contamination a set of overlapping panels are provided which allow the ram maximum maneuver range.

Thus a ram side barrier wall 140, consists of a series of interconnected basically rectangular panels 140A, 140B and 140C which slide with respect to one another and which are interconnected by conventional seals and connectors, to provide in essence a moving wall allowing the slide 30 to traverse ram 35 back and forth with respect to a workpiece W and to the tool/probe exchanger 40.

Figure 9:
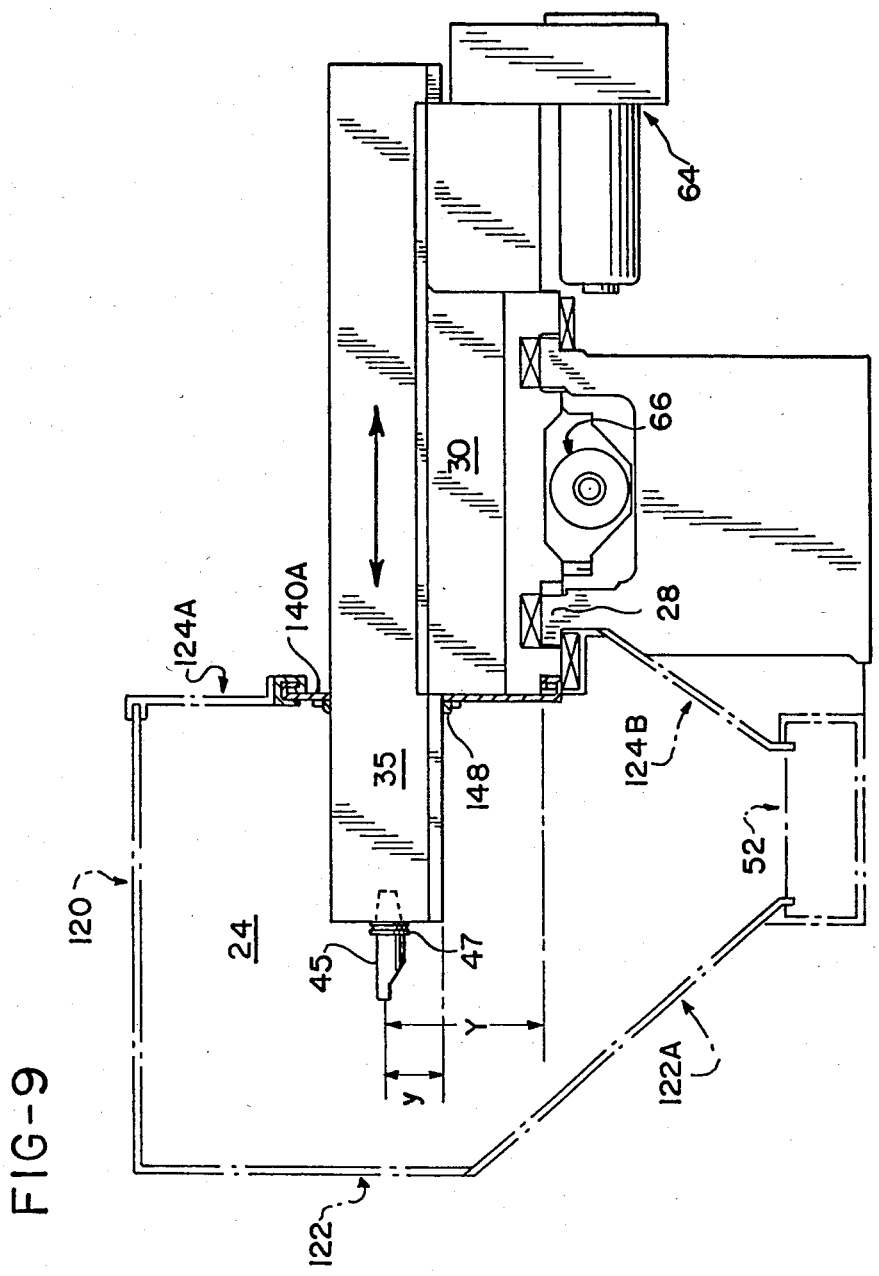
FIG. 9 is a view from the tool changer end with the main machine room shown in phantom lines.

Since the cross slide 32 must maneuver the ram from a position near end barrier wall 130 to a position across from the tool/probe exchanger 40 inside the room extension 102, the ram shield central part 140A is mounted to slide 30, surrounding the ram face (see FIGS. 9 and 10). Panel or part 140A is slidably connected to the two stationary end panels 140B and 140C, which extend beyond the machine room 100 on one end, and beyond the machine room extension 102 on the other end, respectively. The moving shield or panel 140A extends beyond the ram, parallel to wall 124 for a distance sufficient always to engage panels 140B and 140C when the ram is fully traversed.

In an alternate embodiment, the long ram shield 140A may be replaced by expanding-contracting overlapped panel sections (see FIG. 14) connected to the two stationary panels 140B and 140C and the ends of a central shield around the ram face.

As illustrated in FIGS. 9 and 10, wipers 148 on the inner edge of the opening in shield panel 140A, surrounding the ram face, clear the surfaces of ram 35 of metal chips and cutting fluid as the ram is retracted away from the machine room.

Figure 18:
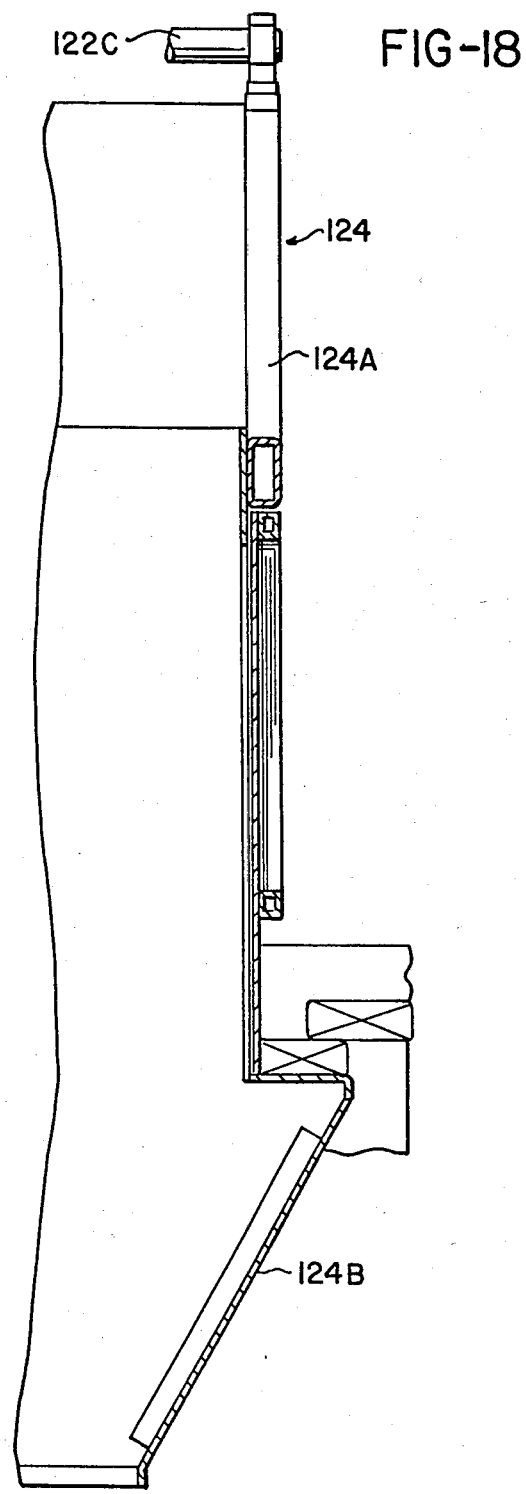
FIG. 18 is a partial sectional view illustrating the construction of the ram side wall in the main machine room.

Referring to FIGS. 9 and 18, the lower section 124B of the ram barrier wall 124 is inwardly sloping to adjacent the conveyor 52 and has an upper L-shaped portion 124C telescoping with the ram shield panel 140A.

Figure 7:
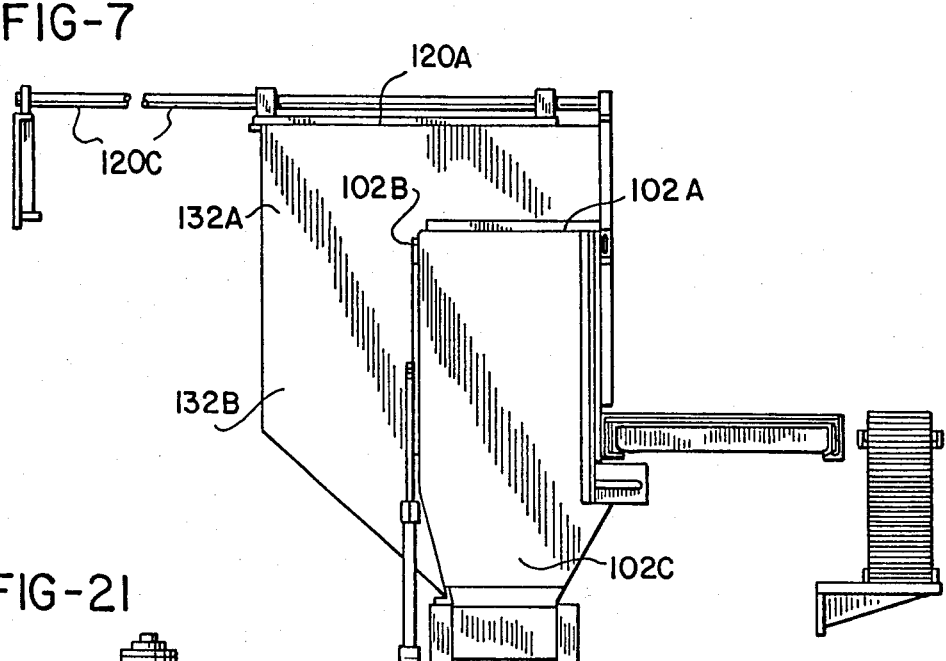
FIG. 7 is an end view, from the tool changer location, of the machine room components isolated from the machine tool.
Figure 19:
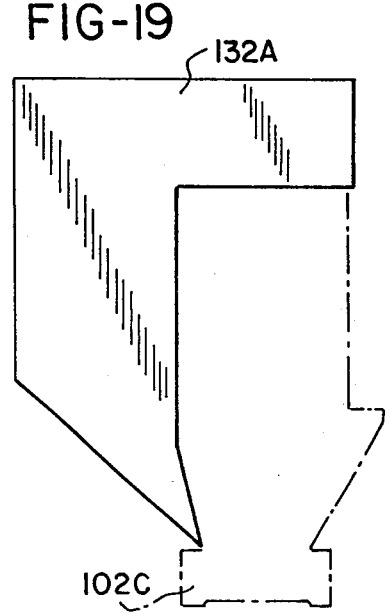
FIG. 19 (sheet 7) is a plan view of the main machine room tool exchange end barrier wall showing the machine room extension in phantom.

As best illustrated in FIGS. 7 and 19, the machine room barrier wall 132 (remote from the operator station) consists of two fixed portions, an upper generally rectangular portion 132A and a lower irregular portion 132B. The upper portion merge at right angles with the upper portion 122A of the headstock barrier wall, with the upper portion of the ram side barrier wall 124A and the front 122B of the upper wall. A cut-out portion (explained later) coincides with the machine room extension 102 to provide for the movement of the ram 38 and other associated components into and out of the machine room extension 102.

As shown in FIG. 7, located adjacent to and merging with the main machining area 100 is the machine room extension 102 consisting of an upper wall 102A, a tool/probe exchanger side wall 122B, a ram side barrier (an extension of the main machine room wall 124) an end barrier wall 102C which extends down to conveyor 52.

The ram side barrier of the extension is a continuation of the ram shield panel 140A and the fixed portions 124A and 124B of the main room wall 128, and lower portion 124B has a bottom which slopes inwardly toward the chip conveyor 52 continuously from the main machine room 100 through the extension 102.

As shown in FIG. 20, the extension wall 102B has a generally rectangular opening 144 for allowing the ram 35 to be advanced therethrough to facilitate tool/probe exchanges with the magazine 44 and/or 88.

A door 145 covers the opening 144 at all times except during the tool/probe exchanging process. This door is retained and guides in the a pair of slide brackets 146, spaced such that the door 145 overlaps opening 144 and seals the machine room extension 102. A hydraulic piston 147 is connected to door 145 to raise and lower it as desired.

Conveyor 52, which is the bottom "moving" wall of the main machine room 100 and extension 102, is positioned directly beneath the workpiece, parallel to bed 25, and is designed to catch and remove metal chips and other debris. The conveyor 52 can be operated to remove chips in either direction of its length, however, it is preferred that the conveyors 52 remove chips to a location beyond the tool exchanger 40, for example depositing into collecting bins 150 at the end of conveyor 52 (FIG. 1) for subsequent removal and/or reprocessing as appropriate.

As illustrated in FIG. 1, positioned just outside door 145 is a tool offset sensor 154 and a probe datum block 156. The tool offset sensor 154 is used when a new tool 45 is introduced into ram tool holder 62 for a machining operation. At this point, it is important to determine if the tool 45 is either worn or not in the proper position in relationship to achieve the accuracy required. Previously, this was accomplished by a fixed trigger probe which took up to thirty seconds to check tool offset. The sensor 154 used in the present system consists of a camera-like device which measures the tool offset and determines whether it is worn in about three to five seconds. These devices are commercially available from MayfiX Chemical and Metal Defraction Company.

The probe datum block 156 is positioned adjacent the tool offset sensor 40 and provides a means for determining the probe's trip point. Since a probe 28 is essentially a high precision switch, it is necessary to determine accurately the trip point in order to be able to verify the accuracy of the machining operation being checked by the probe. After a probe 28 is transferred into the ram tool holder, and before door 145 is closed, the trip point is determined by moving the probe against the datum block 156 from both directions prior to traversing that probe 28 proximate to the workpiece in the main machining area 100 for verifying the accuracy of the operation.

The datum block and offset sensor are mounted outside the machine room (or annex) so they are normally shielded from chips, debris, etc. In addition this location, as can best be seen in FIG. 1, to one side of the headstock and at approximately the same extension of the ram (and tool mounted thereon) as is within the range of tool manuevering for operating on a workpiece, or for checking the accuracy of that workpiece when an operation is finished. This relationship of the headstock, sensor and datum block, and ram locates the cross-slide drive at the same region of its ball screw (or equivalent) for verifying the setting and accuracy of the probe and for verifying the accuracy of the machining work.

Figure 14:
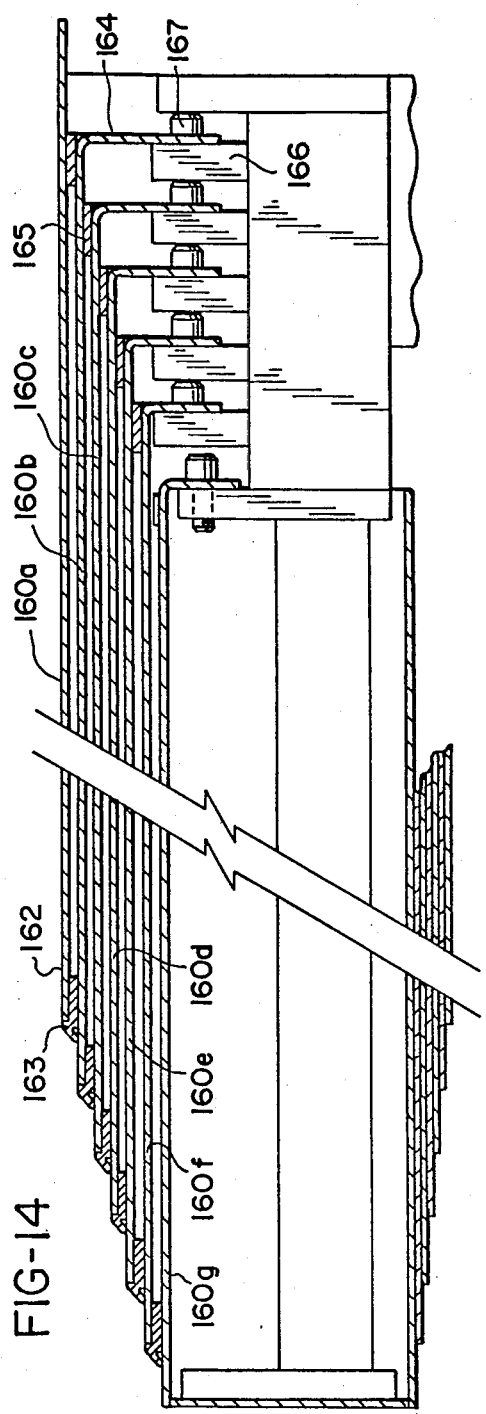
FIG. 14 is a partial view showing the details of the carriage cover construction.
Figure 15:
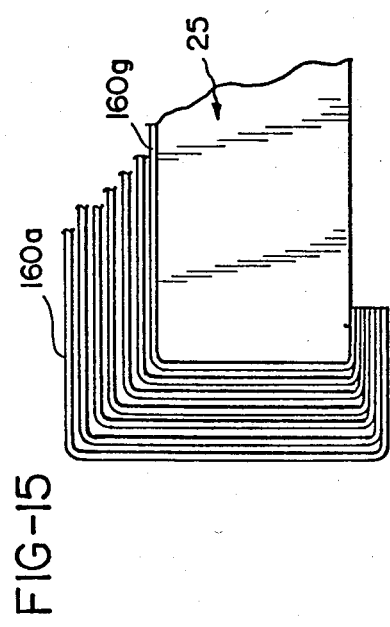
FIG. 15 is a partial end view of the carriage covers of FIG. 14.

As illustrated in FIGS. 3, 14 and 15, positioned on top of the bed superstructure, on opposite sides of slide 30 are expanding and contracting panel sets 160 for protecting the cross slide ways 28. These panel sets (details of one shown) consists of a series of overlapping progressively larger panels 160 each having a hook end 162 fitted with a seal strip 163, and an L-shaped end 164 fitted with a block strip 165. Also block plates 166 are attached by screws 167 whose heads function to engage the next adjacent plate 166. The outer panel 160a is fastened to slide 30, and the innermost panel 160g is secured to the end of bed 25. Beneath the bed ways 28, the panels are in sliding contact as shown in FIG. 15.

During motion of the slide 30 panel 160a moves with it until strip 163 contacts strip 165. As the carriage continues to move the next panel 160b is pulled in that same direction, and so on until the panels are appropriately extended on one side and overlapped on the other side of slide 30. Thus, with these panels the bed ways are enclosed against ambient contamination, and the cover panels form an additional barrier, outside the ram shields 140A, 140B, 140C. Similar sliding cover panels can be used over the ram ways 34.

In order to accommodate automation of larger turnings, and a wide variety of turning, boring, etc. operations, and the automatic verification of the quality of the operations on the workpiece by probing techniques, it is important to minimize the yaw, pitch and roll of the mechanical slides as they maneuvered the ram face and the tool(s) it carries in the machine room 24.

Thus, to minimize the yaw, pitch and roll of cross slide 30 and ram 35, a T-configuration is provided wherein the bed ways 28 are positioned perpendicular to the headstock centerline. In this configuration, as illustrated in FIG. 9, in comparison to conventional horizontal spindle chuckers, the vertical distance Y from the bed ways 28 to the tool center line is reduced at least one inch and the vertical offset y from the ram ways 34 to the tool centerline is reduced at least four inches.

Figure 21:
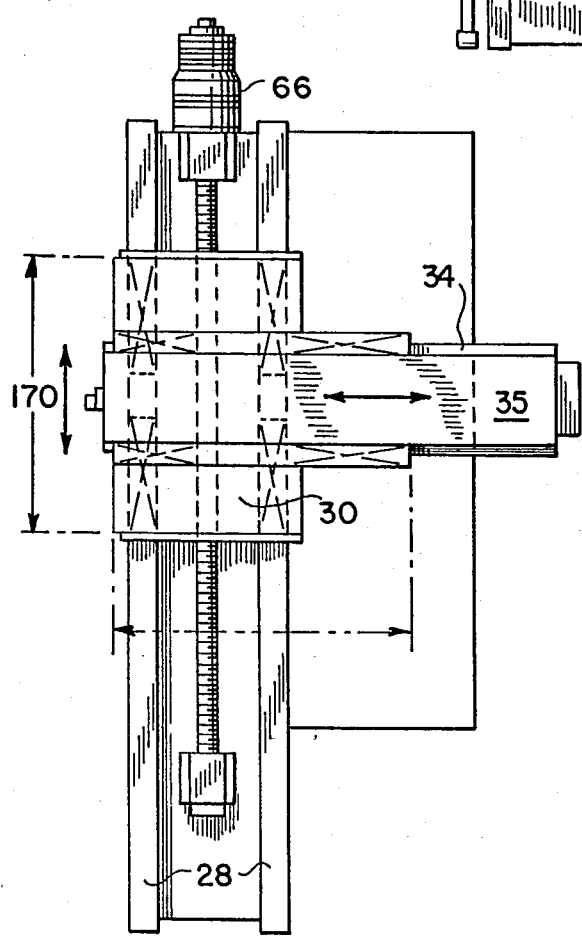
FIG. 21 (sheet 7) is a top view illustrating the bearing configuration used to achieve increased stability.

Additionally, as illustrated in FIG. 21, the guide bearing contact area 170 on both the cross slide 32 and the slide 34 can be lengthened with respect to conventional turning machines, and double tapered gibs are used on both slide ways. For additional stability and ease of machining, the bearing ways, both the cross slide and the ram, are preferably rectangular. Also added machining accuracy is achieved by locating the lead power screws in close proximity to the ways. Since both sets of ways are outside the machine room, they are shielded by the barrier walls of machine room 24 from potential thermal distortion which can result from exposure of these parts to the considerable heat generated in making large high speed cuts.

During operation of the metal machining center 20, a workpiece is first positioned in the operation area by overhead crane or other means through the open upper wall door 136. The workpiece is affixed to the spindle 54 inside the main machining area 116 via the workpiece supporting member 56. Once affixed to the spindle 54, the upper barrier wall door 136 is returned to the closed position. To complete the isolation of the machining area, the operator exits the machine room 24 via the access door 152, closes and locks the door 152.

Simultaneously with the positioning of a new workpiece, the operator selects a specific tool to be mounted in the tool holder. This is accomplished automatically by operator input to the numerical control system control panel. This sequence of operation is controlled through the numerical control equipment, referred to above, which forms no part of the present invention and can be programmed to accomplish the sequence of events by operating upon the conventional hydraulic system which operates the various components of the tool changing device and lathe inside the machine room 24 of the present invention.

Referring to the sequence of operations, particularly with reference to FIG. 1, the ram 35 mounted on the cross slide 32 moves on the ways 68, 70 from inside the main machining area 100 in the operation area 146 to a position outside the main machining area 100 in the machine room extension 102 directly across from the tool/probe exchanger 44 at the tool exchange station. As the door 145 to the machine room extension 102 is lowered, the ram 35 is extended forward to the tool changer 40 located outside of the enclosed machine room extension 102 until it registers exactly with the tool/probe exchanger, and the tool changing procedure is then initiated.

Before or during the movement of the ram 35 from the main machining area 100 to the vicinity of the exchanger 40, the tool exchanger has selected the next tool and has extracted it from the tool storage magazine 44. Once the ram 35 arrives in the vicinity of the exchanger, the ram is extended until tool retainer 62 is outside the machine room extension 102. If there is a tool currently in holder 62, the tool exchanger 40 extracts that tool from the tool holder 62 in a conventional manner. In most instances, the new tool will have been already selected and will be in place in the tool exchanger 40 prior to the arrival of the ram 35 at the exchange station.

Upon extraction of the previously used tool from tool holder 62, the tool exchanger 40 rotates the old and new tools 90°. The tool storage magazine 44 then rotates to position that tool's storage compartment to the proper position for returning the previous tool to its proper holding compartment in the magazine 44.

Now tool exchanger 40 inserts the new tool into tool holder 62 on the ram face 82. Once positioning of the new tool in the ram tool holder 62 is completed, the tool exchanger 44 is adjusted to bring the storage compartment for the old tool into position to receive it from the exchanger 40.

Once the new tool is in tool holder 62 on the ram face, the tool is checked for wear and offset by the offset sensor 154. If the sensor test is within acceptable limits, the ram with the new tool is withdrawn into extension room 102 and ram 35 is traversed into the machining area 100 and into position to perform the next machining operation on the workpiece.

It is critical to the operation of the present invention that the metal chips produced by the machining operation be controlled during the machining operation to avoid the chips 80 becoming lodged in the ways or other machining center 20 moving parts. When utilizing a fixed tool holder 62, this is facilitated by having the tool in the tool holder held in an inverted position so chips will be directed down into the conveyor 52. When using a rotating tool holder in live spindle 86, the tool is rotated in an appropriate direction to throw the chips toward conveyor 52.

Once operations with a tool have been completed, that tool, the workpiece and chuck 48 are airblown free of chips and flushed with coolant by the nozzles positioned about the tool holder 62 on the ram face.

Upon completion of the operation, the workpiece is ready to be probed to verify its accuracy. The cross slide is traversed from inside the the main machining are 100 to the machine room extension 102 into position directly opposite the tool exchanger 40, door 145 is once again opened and ram 35 is again advanced to changer 40 to exchange the tool for an appropriate probe.

Simultaneous with or prior to this movement, the proper probe 28 is either rotated in the tool storage magazine 44 to the exchange position and extracted by the tool exchanger 40, or has been extracted from the specific probe storage magazine 88. Once the previous tool and the probe 28 are exchanged, the probe's switch trip point is checked using a probe datum block 156. If the probe trip point checks out satisfactorily, the ram is retracted into the room extension 102 and once again traversed into the main machining area 100. Door 145 is closed and the tool magazine 44 receives the previous tool into the appropriate storage area.

Referring to FIGS. 22 and 23, this embodiment of the invention relates to a high production capacity system and like reference numerals with the suffix "A" are used to identify like parts. In this system the headstock 20A includes a pair of drive spindles 54A and 54 B, each of which is fitted with a workpiece holding chuck (or collet) 48A and 48B. Preferably these are of a known power operated type to minimize exchange time for receiving and removing like workpieces WP-1 and WP-2. The drive 60A (FIG. 22) is connected to each of spindles 54A and 54B through appropriate clutches (not shown) so either spindle may rotate independently of the other.

The bed 25A extends transversely of the headstock and spindles, as in the previous embodiment, and a cross slide 30A is moved along the bed by a drive 66A past both chucks and outward to one side, across from a tool exchange station 40A where a rotatble/indexable tool magazine 44A is suported. A ram 35A is mounted extending across the slide 30A and is movable toward and away from the workpieces and the tool magazine, generally in the same fashion as in the previous embodiment. The face of ram 35A has a tool holder or socket (not shown) adapted to receive any one of a plurality of tool carrying pallets 47A, each of which mounts a number of different cutting tools 45A that can make different turning operations on the workpieces WP-1 and WP-2, through appropriate movement of the ram and cross slide under a suitable numerical control.

The main machining room is divided into two parts 100A and 100B, and the face of ram 35A can enter either, so the tools can operate on either workpiece. The enclosure for the machine room is provided by the same type of bulkheads and doors as previously described, and includes the extension space 102A in which the ram 35A is located while tool pallets are being changed. The inspection door 130B is of the same type as door 130A in FIG. 2, and the walls surrounding the spindles are of the type shown in FIG. 13 except for surrounding both spindles. The overhead door is divided into two independently operable load/unload doors 122B and 122C and a vertically movable divider door 131A operates, when in its lowered closed position to separate the two machine room parts 100A and 100B so machining operations can continue in one part while a workpiece is being loaded or unloaded in the other part. Door 131A is shown open in FIG. 23, with the ram 35A traversing beneath that door. The remaining partitions or bulkheads are of the same nature as shown in the first embodiment.

The additional tool carrying pallets 47A are supported on a rotatable indexing carrier 44A which can be moved under numerical control to bring the desired pallet to the exchange position. The pallets are simply moved directly onto appropriate receivers on the carrier, the ram holder is released and the ram withdrawn sufficiently to permit rotation of the carrier, and the ram again advanced to engage a different pallet. Obviously, more than three pallets can be provided if desired.

A horizontally sliding door 145A, controlled by a hydraulic cylinder 147A, can be opened to give the ram access to the carrier from the machine room extension 102A.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A machining center comprising:
   a headstock including a rotatably mounted spindle having a longitudinal axis and means connected to rotate said spindle about its said axis,
   a workpiece supporting member driven by said spindle,
   a bed extending generally at a right angle to said spindle axis and in spaced relation thereto,
   a cross slide mounted on said bed,
   a ram mounted on said slide parallel to said spindle and having one end thereof facing said headstock,
   at least one tool holder on said one end of said ram,
   slide drive means for traversing said slide along said bed and ram drive means for moving said ram transversely of said bed to move a tool mounted in said tool holder toward and away from a workpiece held in said workpiece supporting member, and
   barrier means defining a machine room isolating said headstock, said bed, said cross slide, all of said drive means and all but said one end of said ram from said workpiece supporting member and said tool holder, said room encompassing the range of movement of said one end of said ram.

2. The machining center of claim 1 wherein said barrier means further comprises:
   a moving shield member surrounding said one end of said ram and extending along said bed in opposite directions laterally from said ram and beyond the ends of said cross slide; and
   stationary shield members positioned along said bed extending from the ends of said bed toward said cross slide and cooperating with said moving shield member when said cross slide is traversed along said bed such that said moving shield member overlaps at all times at least a portion of each of said stationary shield members.

3. A machining center as defined in claim 2 including wipers mounted on said moving shield member and surrounding and engaging said one end of said ram to wipe debris from surfaces of said ram as it is moved through said moving shield member.

4. The machining center of claim 1 including
   conveyor means extending beneath said workpiece supporting member and alongside said bed to a location beyond one end of said bed for carrying debris resulting from a machining operation to a collection location at the exterior of the machining center.

5. The machining center of claim 4 wherein said tool holder supports tools in an inverted position such that chips produced during machining operations tend to be directed down onto said conveyor means.

6. A machining center as defined in claim 4 wherein said barrier means defines a machine room including walls extending over the top and sides of said workpiece supporting member and downward to adjacent said conveyor, and
   said conveyor constitutes the bottom wall of said machine room.

7. A machining center as defined in claim 6 wherein a movable loading door is mounted in said walls above said spindle and workpiece supporting member, said loading door being movable between open and closed positions for loading and unloading of workpieces to be machined.

8. A machining center as defined in claim 6 including an access door mounted in one of the side walls of said machine room and movable between open and closed positions to permit operator access to said room, and a window in said access door for observing said workpiece during machining operations.

9. The machining center of claim 1 wherein said bed and said slide traversing drive means are arranged such that said slide can travel to either side of said spindle axis.

10. The machining center of claim 1 further comprising:
    nozzle means on said one end of said ram, and
    means for supplying a fluid through said nozzle means for flushing said one end of said ram and a tool and its holder fitted to said ram, and to flush the region where such tool engages a workpiece being machined.

11. The machining center of claim 1 wherein said bed is positioned such that said cross slide can travel to a tool exchanging station away from said workpiece supporting member.

12. A machining center as defined in claim 1, further comprising
    a spindle rotatably mounted in said ram and including a tool holder fixed to said spindle and located at said one end of said ram to provide a rotating tool support for machining work on a workpiece.

13. A machining center as defined in claim 1, further comprising
    a tool exchange station located to one side of said headstock opposite said bed and including a tool magazine for storing a plurality of tools and/or measuring probes in exchangable carriers all of which are acceptable in said tool holder on said one end of said ram, and
    means for transferring tools and/or probes between said magazine and said tool holder.

14. A machining center as defined in claim 13, wherein
    said means for transferring tools and/or probes comprises a tool changer mechanism located between said magazine and said bed and operable to exchange tools between said magazine and said tool holder when said slide is moved to said tool exchange station.

15. Machining center of claim 13 wherein
    said barrier means includes an extension of said machine room into the region between said tool changer mechanism and said bed,
    a tool access door in said extension of said machine room and aligned with said tool changer mechanism, said door being normally closed and being openable to provide a passage through which said tool changer mechanism can extract a tool carrier from said tool holder and insert a tool carrier into said tool holder.

16. A machining center as defined in claim 13 further including
a separate probe storage magazine located adjacent said tool exchanger and adapted to hold a plurality of measuring probes in the same interchangable carriers as said tool, said probe storage magazine also interacting with said tool exchanger in the same manner as said tool magazine.

17. A machining center particularly adapted for automated turning of large workpieces, comprising:
a headstock including a rotatably mounted spindle and means connected to rotate said spindle, a chuck mounted on and driven by said spindle, and drive means connected to rotate said spindle;
a bed extending transversely to said spindle in spaced relation thereto and defining a machining area between said chuck and one end of said bed;
a cross slide mounted on said bed and slide drive means for traversing said slide along said bed;
a ram mounted on said slide parallel to said spindle and having one end thereof facing said chuck, at least one tool holder on said one end of said ram, and ram drive means for moving said ram transversely of said bed whereby operation of said slide drive means and said ram drive means can maneuver a tool mounted in said tool holder toward and away from a workpiece held in said chuck; and
barrier means including interconnected top, side and end walls defining a machine room isolating said headstock, said bed, said slide, all of said drive means and all but said one end of said ram from said chuck and said tool holder, said room encompassing the range of movement of said one end of said ram as said slide is traversed along said bed and said ram is moved across said slide.

18. A machining center as defined in claim 17, including
said bed having one of its ends extending away from said headstock for a substantially greater distance in one direction whereby said slide can be traversed away from said chuck to a tool changing area beyond the area where a tool can engage a workpiece,
a tool exchange station located to one side of said headstock opposite said one end of said bed and including a tool magazine for storing a plurality of tools and/or measuring probes in exchangable carriers all of which are acceptable in said tool holder on said one end of said ram, and a tool changer mechanism located between said magazine and said one end of said bed and operable to exchange tools between said magazine and said tool holder when said slide is moved to said tool exchange station.

19. A machining center particularly adapted for automated turning of workpieces, comprising:
a headstock including a pair of rotatably mounted spindles having separate parallel longitudinal axes and drive means connected to rotate said spindles independently of each other, said spindles being located in spaced generally horizontal alignment,
workpiece supporting means mounted on and driven by each of said spindles,
a bed extending transversely to said spindles in spaced relation thereto and defining separate machining areas between said workpiece supporting means and one end of said bed;
a cross slide mounted on said bed,
slide drive means connected to move said slide along said bed and into each of said machining areas,
a ram mounted on said slide parallel to said spindle axes and having one end thereof facing into said machining areas,
at least one tool holder on said one end of said ram,
ram drive means for moving said ram with respect to said slide toward and away from said workpiece holding means to maneuver a tool mounted in said tool holder toward and away from workpieces, and
barrier means including interconnected top, side and end walls defining machine rooms isolating said headstock, said bed, said slide, all of said drive means and all but said one end of said ram from said workpiece holding means and said tool holder, said rooms encompassing the range of movement of said one end of said ram as said slide is traversed along said bed and said ram is moved across said slide.

20. A machining center as defined in claim 19, including
said bed having one of its ends extending away from said headstock for a substantially greater distance in one direction whereby said slide can be traversed away from said machining areas to a tool changing area,
a tool exchange station located opposite said one end of said bed and including a magazine for storing a plurality of tools in exchangable carriers all of which are acceptable in said tool holder on said one end of said ram, and means operable to exchange tools between said magazine and said tool holder when said slide is moved to said tool exchange station.

21. The machining center of claim 19 wherein said barrier means further comprises:
a moving shield member surrounding said one end of said ram and extending along said bed in opposite directions laterally from said ram and beyond the ends of said cross slide; and
stationary shield members positioned along said bed extending from the ends of said bed toward said cross slide and cooperating with said moving shield member when said cross slide is traversed along said bed such that said moving shield member overlaps at all times at least a portion of each of said stationary shield members.

22. A machining center as defined in claim 21 including
wipers mounted on said moving shield member and surrounding and engaging said one end of said ram to wipe debris from surfaces of said ram as it is moved through said moving shield member.

23. The machining center of claim 19 including
conveyor means extending beneath said workpiece supporting member and alongside said bed to a location beyond one end of said bed for carrying debris resulting from a maching operation to a collection location at the exterior of the machining center.

24. The machining center of claim 23 wherein said tool holder supports tools in an inverted position such that chips produced during machining operations tend to be directed down onto said conveyor means.

25. A machining center as defined in claim 23 wherein said barrier means defines a machine room including walls extending over the top and sides of said workpiece supporting members and downward to adjacent said conveyor, and said conveyor constitutes the bottom wall of said machine room.

26. A machining center as defined in claim 25 wherein movable loading doors are mounted in said walls above said spindles and workpiece supporting members, said loading doors being movable independently between open and closed positions for loading and unloading of workpieces in the respective machine rooms.

27. A machining center as defined in claim 25 including a divider door mounted between said machine rooms and movable between open and closed positions to permit, when opened, access for said one end of said ram to each of said machine rooms and, when closed, to isolate said machine rooms from each other during machining operations in one of said rooms.

28. A machining center comprising:

a headstock including a rotatably mounted spindle having a longitudinal axis and means connected to rotate said spindle about its said axis, a workpiece supporting member driven by said spindle, a bed extending generally at a right angle to said spindle axis and in spaced relation thereto, a cross slide mounted on said bed, a ram mounted on said slide parallel to said spindle and having one end thereof facing said headstock, at least one tool holder on said one end of said ram, said holder also being adapted to support a measuring probe, slide drive means for traversing said slide along said bed and ram drive means for moving said ram transversely of said bed to move a tool mounted in said tool holder toward and away from a workpiece held in said workpiece supporting member, a tool exchange station located to one side of said headstock opposite said bed and including a tool magazine for storing a plurality of tools and/or measuring probes in exchangeable carriers all of which are acceptable in said tool holder on said one end of said ram, means for transferring tools and/or probes between said magazine and said tool holder, means defining a tool verification position, said verification position being located at approximately the same distance from said one face of said ram as is said workpiece supporting member, whereby verification operations on a tool supported in said tool holder are performed with approximately the same ram extension as employed during machining operations on a workpiece, and barrier means including interconnected top, side and end walls defining a machine room isolating said headstock, said bed, said slide, said tool exchange station, said verification position, all of said drive means and all but said one end of said ram from said workpiece holding means and said tool holder, said room encompassing the range of movement of said one end of said ram as said slide is traversed along said bed and said ram is moved across said slide.

* * * * *